United States Patent [19]

Bieri

[11] 3,982,521

[45] Sept. 28, 1976

[54] HEAVY DUTY JIG SAW

[76] Inventor: Hans Bieri, Toedistrasse 9, Pfaeffikon, Switzerland, 8330

[22] Filed: Oct. 20, 1975

[21] Appl. No.: 623,896

[30] Foreign Application Priority Data

Oct. 23, 1974 Switzerland .................. 14170/74

[52] U.S. Cl. .................. 125/16 R; 173/32; 408/76

[51] Int. Cl.[2] .................. B28D 1/06; B23B 45/14

[58] Field of Search .................. 173/32, 33; 125/12, 125/14, 16 R; 408/76

[56] References Cited

UNITED STATES PATENTS

| | | | |
|---|---|---|---|
| 3,456,738 | 7/1969 | Harry | 173/32 X |
| 3,722,497 | 3/1973 | Hiestand | 125/14 |

FOREIGN PATENTS OR APPLICATIONS

| | | | |
|---|---|---|---|
| 626,333 | 9/1927 | France | 125/16 R |
| 492,472 | 2/1930 | Germany | 408/76 |

*Primary Examiner*—Harold D. Whitehead
*Attorney, Agent, or Firm*—W. G. Fasse; W. W. Roberts

[57] ABSTRACT

The Present heavy duty jig saw is constructed for cutting through walls of concrete, masonry, and the like. For this purpose a somewhat elongated suction bell carries a guide bar secured to one longer side of the bell. The guide bar in turn carries tool carrier means which are movable back and forth along the guide bar by a separate hydraulic drive. The tool carrier supports a tool head which is reciprocable by a second hydraulic drive. The suction bell is provided with a sealing skirt around its open edge and preferably adjustable legs secured to the bell limit the elastic deformation of the sealing skirt.

8 Claims, 6 Drawing Figures

3
6
13
14
15
16
16'
17
17'
19
20
22
23
24
32
33
35
36
37
38
39
40
41
43
48
A

HEAVY DUTY JIG SAW

BACKGROUND OF THE INVENTION

The present invention relates to a heavy duty jig saw, especially for cutting through walls such as concrete walls, masonry, and the like.

In connection with building alterations or extensions, it is frequently necessary to break through concrete walls to provide for additional door or window openings. This job has heretofore usually been done by drilling a row of closely spaced holes through the wall, sealing or floor of the building and then severing the remaining lands between adjacent holes. Such work is not only cumbersome and time consuming, especially when steel reinforced concrete walls are involved, it also results in a very uneven edge around the opening.

OBJECTS OF THE INVENTION:

In view of the foregoing, it is the aim of the invention to achieve the following objects singly or in combination:

- to avoid the above mentioned manner of cutting holes into hard materials, such as concrete walls, by providing a jig saw which is powerful enough for the purpose and capable of making a straight cut in any type of wall and regardless of its horizontal or vertical extension;
- to provide a portable jig saw which is light enough for attachment to vertical and even overhead walls to make a straight cut, even through thick concrete walls or the like in an economical manner;
- to provide a tool head which will permit to cut into a corner between two walls whereby the tool proper must be able to approach the corner along one wall and then along the other wall, for example, to cut into a drilled hole in the corner; and
- to secure the supporting suction or vacuum bell to the respective wall by vacuum as well as by additional supporting legs.

SUMMARY OF THE INVENTION:

According to the invention there is provided a heavy duty jig saw which combines the following features. A base plate functioning as a suction bell is surrounded by a rubber elastic sealing skirt which permits the creation of reduced pressure inside the suction bell when the latter is applied to a wall. Tool carrier means including a tool drive head are secured to a longitudinal guide bar on the suction or vacuum bell whereby one hydraulic drive is provided for the reciprocating tool movement and a further hydraulic drive, which is independent of the first hydraulic drive, is provided for advancing the tool carrier back and forth along said guide bar to provide for a feed advance movement of the jig saw blade. The pump means for evacuating the suction bell and the hydraulic pump means for supplying hydraulic pressure to the separate drive means are arranged as remote units separated from the saw proper and the separate units are interconnected by respective conduit means. It is an advantage of the invention that the jig saw proper is not only light enough for transportation but also for attachment to vertical walls and even to overhead walls, and that straight cuts may be made even through thick concrete walls or the like in a very economical manner.

BRIEF FIGURE DESCRIPTION:

In order that the invention may be clearly understood it will now be described, by way of example, with reference to the accompanying drawings, wherein.

Figure 1:
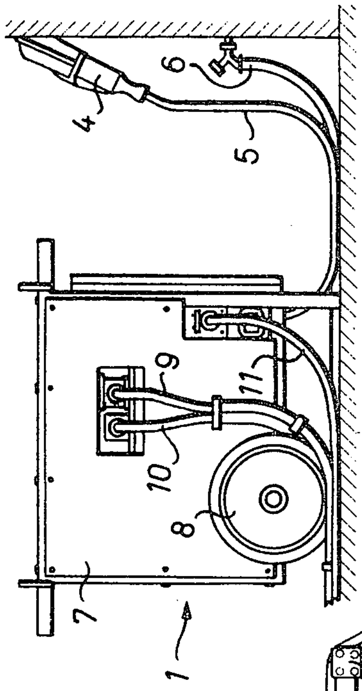
FIG. 1 illustrates a simplified side view of a mobile hydraulic pump cart.
Figure 2:
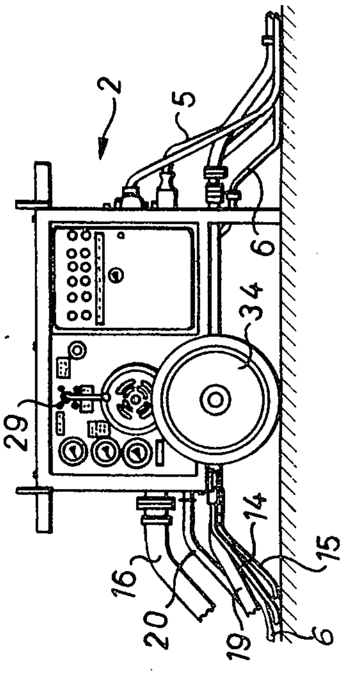
FIG. 2 is a similarly simplified side view of a mobile control and vacuum pump cart.
Figure 3:
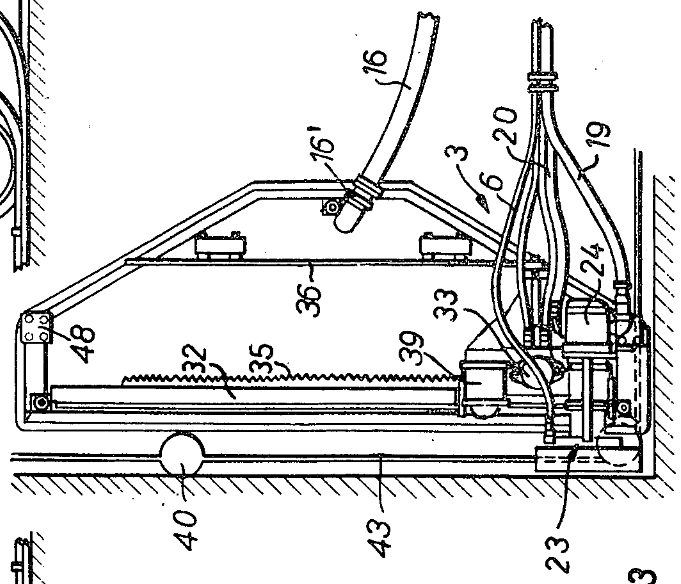
FIG. 3 illustrates the saw unit proper secured to a vertical wall and further showing the completion of a vertical slot in said vertical wall.

DETAILED DESCRIPTION OF EXAMPLE EMBODIMENTS:

The present heavy duty jig saw is rather mobile because the pump group 1 shown in FIG. 1, the control and vacuum pump group 2 shown in FIG. 2, and the jig saw unit 3 shown in FIG. 3 are separately transportable units interconnected by releasable hose means and electrical cables.

The pump unit or group 1 comprises a mobile cart 7 and several hydraulic pumps operable in parallel to each other as well as the respective electric motor for driving the pump means. Depending on the power required more or fewer pumps may be switched into operation or out of operation. These pumps are supported inside the carts 7. The cart 7 is provided with wheels 8 and hence is easily transportable to any construction site. Power is supplied to the electric motor through a power cable 5 connectable to an electric power outlet 4. The hydraulic pressure medium is supplied from the pump unit 1 to the control and suction unit 2 through a flexible hose 10. A further flexible hose 9 constitutes a return conduit for the hydraulic fluid back to the pumps. As mentioned, depending on the power required by the saw unit 3, it is possible to use, for example, three or four pumps simultaneously by connecting these pumps with the electric drive motor or by disconnecting one or two or several of such pumps from the motor. A hose 6 supplies cooling water to the control and vacuum unit 2 for cooling the return oil. The cooling water supply hose 6 is also connected to the saw unit 3 proper supplying cooling water directly to the cutting location.

Hose means 9 and 10 connect the pump group 1 to the mobile control and vacuum group 2. These two groups are also connected by an electrical cable 11 and by a water hose. The control and vacuum unit 2 comprises at least one further hydraulic pump driven by an electric motor. This additional pump supplies the pressure oil for the feed advance of the tool carrier along a guide bar to be described. The group 2 further comprises electrical and hydraulic control means 29 for the hydraulic feed advance just mentioned as well as for the hydraulic reciprocating drive for the saw blade proper. The unit 2 comprises a vacuum generator, for example, in the form of a fan type air suction device operatively connected to a vacuum space 45 below the suction bell 17 or rather below the base plate 17 constructed as a suction bell. By generating in said vacuum space 45 a sufficiently reduced pressure it is possible to secure the saw unit 3 to a wall or the like in any desired position. Group 2 is also constructed as a mobile cart having wheels 34. A suction hose 16 of relatively large diameter connects the vacuum bell 17 with the reduced pressure space 45 in order to continuously maintain the reduced pressure when the saw is in operaton. Hydraulic pressure hose means 14 and 15 for the supply and return of the pressure oil for the feed advance drive of the saw tool carrier interconnects the units 2 and 3. The coupling means for securing the hose ends to the respective units 1, 2 and 3 are of the rapid release type well known in the art.

In this connection it will be appreciated that the hose and conduit means extending to the left in FIG. 2 are connected to the saw unit 3 as shown in FIG. 3.

Figure 4:
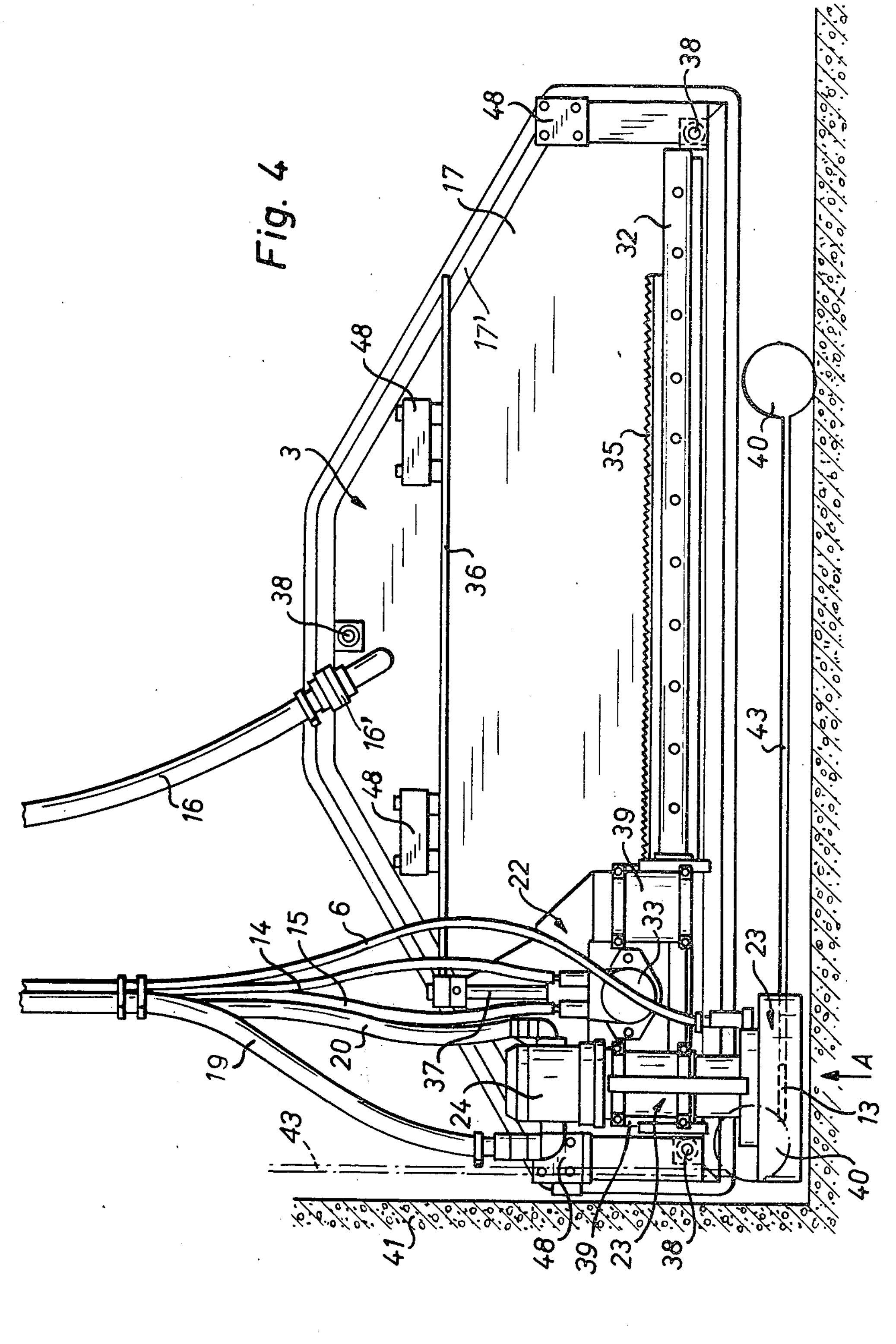
FIG. 4 is a view similar to that of FIG. 3, however, now showing the plan view of the saw unit proper secured to a horizontal wall and after the completion of a horizontal slot.
Figure 5:
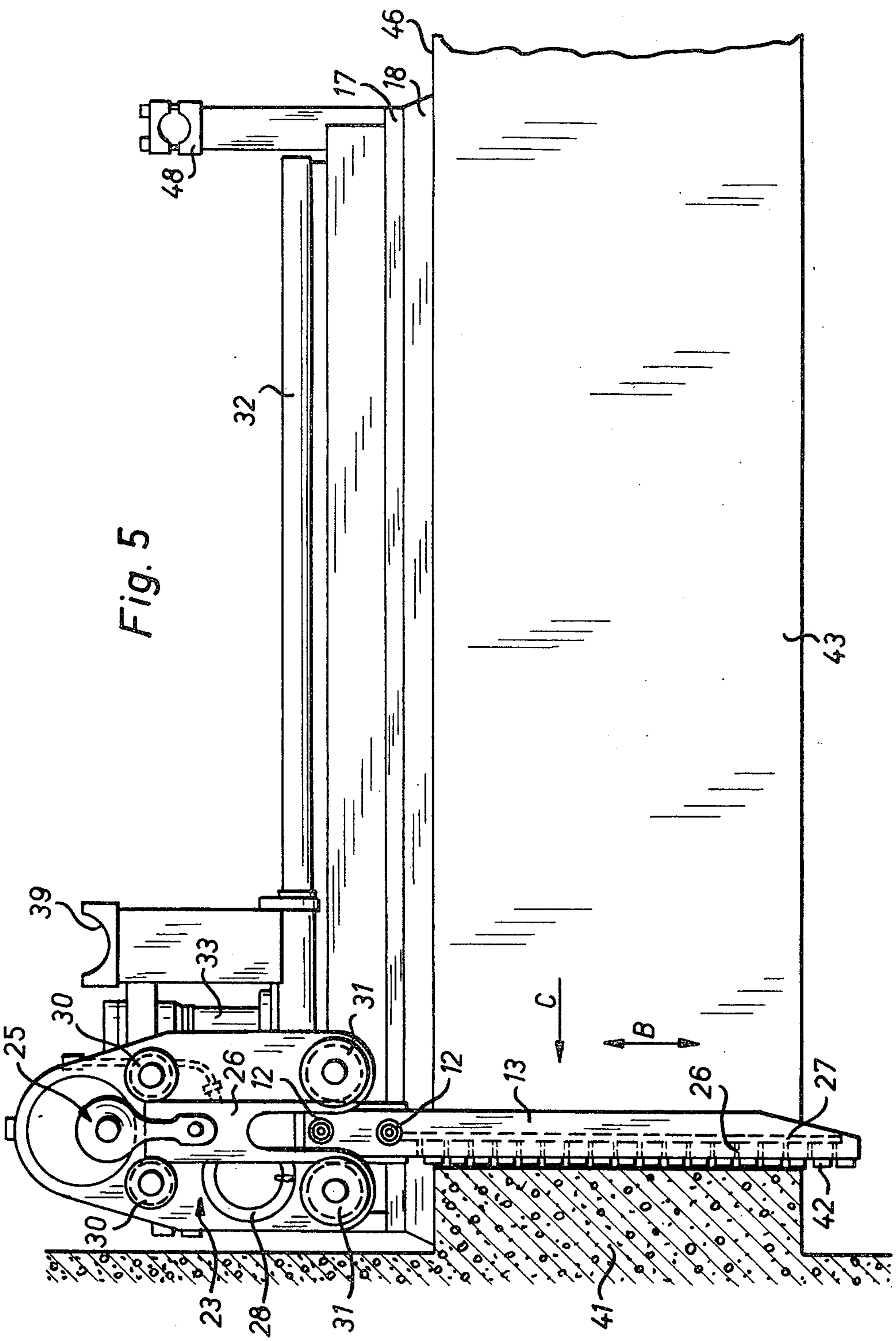
FIG. 5 illustrates the saw as viewed in the direction of the arrow A in FIG. 4.

The saw unit 3, as illustrated in FIGS. 3, 4 and 5, comprises a base plate 17 constructed as a suction bell. The outer rim of the base plate 17 has secured thereto a sealing skirt 18 made of relatively soft, rubber elastic material. The top of the plate or bell 17 has secured thereto coupling means 16' for the suction hose 16 to generate a reduced pressure or vacuum in the hollow space 45. By means of this vacuum it is possible to rigidly press the entire saw unit 3 against the respective supporting surface, such as a vertical, horizontal or overhead wall. Thus, the hollow space 45 is bounded by the respective supporting surface, such as a wall, the sealing skirt 18 and the base plate 17.

In order to limit the elastic deformation of the sealing skirt 18 under the effect of the reduced pressure there are provided supporting legs 38 which may be adjusted in their effective length by means well known.

The base plate or vacuum bell 17 may be assembled from several parts, for example, by welding and frame type reinforcement members 17', as best seen in FIG. 4., may be employed. The base plate 17 carries a guide rod 32 which is preferably arranged alongside a longitudinal edge of the base plate 17 which itself has preferably a trapezoidal shape as illustrated. The guide rod 32 supports a tool carrier 22 in a secure but movable manner. The tool carrier 22 in turn supports two blocks 39 arranged on opposite corners of the tool carrier 22 for alternately securing a tool drive head 23 to one or the other block 39 so that the saw blade 13 may advance into a corner from one or the other side and as close to the respective opposite wall as possible. As shown in FIG. 4 the tool drive head 23 is secured to the left hand block 39.

The tool drive head 23 is adjustable and includes a hydraulic first drive motor 24 which drives an eccentric mechanism 25 for converting a rotary movement into a reciprocating movement of a drive rod 26. The drive rod 26 is guided on both sides by rollers 30, 31 which assure a precise up and down movement on a linear path. The drive rod 26 has an elongated recess or cutout at its lower end in which recess a saw blade 14 may be held in a replaceable manner, for example, by means of threaded studs 12 each of which extends through a respective hole in the saw blade 13. Thus, the saw blade 13 follows the reciprocating up and down movement of the drive rod 26 as indicated by the arrow B in FIG. 5. This reciprocating movement in combination with the feed advance movement of the tool carrier 22 cause the sawing of a slot 43 in a building wall which may be a vertical wall or a horizontal floor or a ceiling. FIG. 4 illustrates the cutting of a slot 43 into a concrete floor 41.

The saw blade 13 has a cutting edge provided with diamond or hard metal inserts 42 which are spaced from each other in the longitudinal direction of the blade. Lateral cross bores 26 extend into the central longitudinal channel 27 of the saw blade for supplying a cooling liquid directly into the saw blade. The channel 27 which interconnects all the outlet bores 26 extends into the drive head 23 where it is connected through a flexible hose 28 to the cooling liquid supply hose 6.

In order to move the tool carrier 22 back and forth along the guide rod 32, a tooth rack 35 is arranged in parallel to the guide rod 32 as best seen in FIG. 4. The support 22 with the drive head 23 secured thereto rides on the guide rod 32 since the latter extends through a respective channel in the support 22. A feed advance hydraulic motor 33 also secured to the tool carrier 22 drives the whole unit in the direction of the arrow C as shown in FIG. 5, whereby the drive head 23 moves in parallel to the base plate 17. The control means provided in the control unit 2 permit the selection of an adjustable feed advance force which cannot be exceeded in operation. Valve means for this purpose are well known in the art. Thus, the feed advance is dependent on the cutting capacity of the saw blade, which may vary depending on the type of material to be cut. The rotary hydraulic drive motor 33 drives a pinion, not shown, which engages the rigidly mounted tooth rack 35. A guide arm 37 connects the support 22 with a guide rod 36 secured to the base plate 17 in parallel to the guide bar 32. Thus, the guide arm 37 prevents any tilting of the tool drive head 23.

The base plate 17 may have any suitable shape, however, it has been found that the illustrated trapezoidal shape is especially advantageous as it provides a longitudinal edge along which the tool carrier 24 may be moved back and forth. Supporting legs 38 are secured to the base plate 17 at a point spaced from each other as far as possible and inside the rubber elastic sealing skirt 18. Thus, the entire saw unit 3 is supported by these legs 38 when a reduced pressure is produced in the vacuum space 45, whereby the skirt 18 is relieved from the pressure and thus enabled to simply provide a sealing by compensating for irregularities in the supporting surface 46 of a wall, floor or the like. Thus, only a minor fraction of the force resulting from the vacuum passes through the skirt 18.

As mentioned above, two spaced blocks 39 are secured to the tool carrier 22 so that the tool drive head 23 may be attached to one or the other block. This feature of the invention makes it possible to approach a corner from the left or from the right and to move the tool as close to the adjacent wall as possible. Incidentally, the tool may also be removed and inserted into the drive bar 26 for cutting in the opposite direction. Clamping devices 48 are attached to the vacuum bell or support plate 17 for securing additional rods or legs to the plate 17. These additional rods, not shown, support the entire saw unit 3 against slipping or falling off in case the vacuum should be interrupted. These additional supporting legs may rest on the horizontal floor, especially when the saw unit 3 is attached to a vertical wall as shown in FIG. 3.

Prior to operating the present jig saw, at least one hole 40 will be drilled into the wall for an easy initial entrance of the saw blade 13.

The vacuum generator is continuously in operation during the working of the tool whereby any minor leakage vacuum losses are compensated and due to the elastic sealing skirt 18 such losses are compensated even on rough surfaces. As mentioned, the saw unit 3 may be secured to any wall, be it horizontal, slanted, vertical or even overhead, because the reduced pressure or vacuum holds the saw unit 3 in position and any vacuum interruption will not cause any damages because of the legs inserted into the clamping devices 48.

Figure 6:
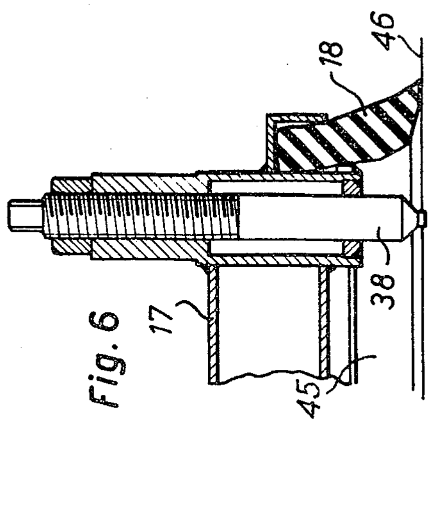
FIG. 6 illustrates on a somewhat enlarged scale a sectional view through the base plate and one of the base plate supporting legs as well as through the elastic sealing skirt.

Referring to FIG. 6, it should be mentioned that the upper end of the legs 38 may be threaded to extend through a threaded hole in the base plate 17 and a counter nut may be threaded onto the upper threaded end of the legs which extend out of the threaded hole in the support plate 17 whereby the effective length of these legs 38 may easily be adjusted as is well known in the art.

Although the invention has been described with reference to specific example embodiments, it will be appreciated, that it is intended to cover all modifications and equivalents within the scope of the appended claims.

What is claimed is:

1. A jig saw comprising a first unit including base vacuum bell means, elastically flexible sealing skirt means secured to said bell means to face any supporting surface, elongated guide means rigidly secured to said bell means to extend substantially in parallel to said supporting surface, tool carrier means including a drive head movably secured to said elongated guide means, first hydraulic drive means as part of said tool carrier means for producing a reciprocating tool movement, separate second hydraulic drive means operatively connected to said tool carrier means for moving said tool carrier means along said elongated guide means, a second unit including vacuum pump means as well as hydraulic pump located remote from said first unit, and conduit means operatively interconnecting said first and second units.

2. The jig saw according to claim 1, wherein said vacuum pump means and said hydraulic pump means of said second unit are constructed as respective separate, mobile sub-groups.

3. The jig saw according to claim 1, wherein said tool carrier means comprise two tool support bucks for alternately securing said tool drive head to said bucks.

4. The jig saw according to claim 1, wherein said vacuum bell means have a substantially trapezoidal shape, said elongated guide means being secured to said trapezoidal vacuum bell means along the longer side thereof.

5. The jig saw according to claim 1, further comprising cooling supply means connected to said drive head for supplying a cooling medium directly to the saw blade.

6. The jig saw according to claim 1, wherein said vacuum bell means comprise rigid legs which limit the elastic deformation of said elastically flexible sealing skirt.

7. The jig saw according to claim 6, wherein said rigid supporting legs are adjustable in their lengths.

8. The jig saw according to claim 1, further comprising clamping means secured to the vacuum bell means for removably securing support means to said bell means.

* * * * *